United States Patent
Han et al.

(10) Patent No.: US 12,321,728 B2
(45) Date of Patent: Jun. 3, 2025

(54) METHOD OF REBINDING COMPUTING UNIT IN HETEROGENEOUS COMPUTING CLOUDS AND APPARATUS THEREOF

(71) Applicant: Research & Business Foundation SUNGKYUNKWAN UNIVERSITY, Suwon-si (KR)

(72) Inventors: Hwansoo Han, Suwon-si (KR); Sungin Hong, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 323 days.

(21) Appl. No.: 18/091,160

(22) Filed: Dec. 29, 2022

(65) Prior Publication Data

US 2023/0214196 A1 Jul. 6, 2023

(30) Foreign Application Priority Data

Dec. 30, 2021 (KR) .................. 10-2021-0192932

(51) Int. Cl.
  *G06F 9/44* (2018.01)
  *G06F 8/41* (2018.01)
  *G06F 9/445* (2018.01)

(52) U.S. Cl.
  CPC .......... *G06F 8/41* (2013.01); *G06F 9/44521* (2013.01)

(58) Field of Classification Search
  CPC .............................. G06F 8/41; G06F 9/44521
  See application file for complete search history.

(56) References Cited

U.S. PATENT DOCUMENTS 10,698,731 B1 * 6/2020 Zelenov ............... G06F 9/5044
2008/0256330 A1 * 10/2008 Wang ................... G06F 9/3879
712/E9.016

(Continued)

FOREIGN PATENT DOCUMENTS

CN 113031954 A 6/2021
JP 2021-511609 A 5/2021

(Continued)

OTHER PUBLICATIONS

Korean Notice of Allowance issued on May 27, 2024, in counterpart Korean Patent Application No. 10-2021-0192932 (2 pages in Korean).

(Continued)

*Primary Examiner* — Bradley A Teets
*Assistant Examiner* — Lenin Paulino
(74) *Attorney, Agent, or Firm* — NSIP Law

(57) ABSTRACT

The disclosure is related to a dynamic rebinding method for a computing unit in heterogeneous computing clouds. The method includes A dynamic rebinding method for a computing unit in heterogeneous computing clouds, receiving a first computing request from a terminal, generating a static FAT binary by compiling a device binary codes for each of all types of heterogeneous accelerators based on the first computing request, generating and storing global data including device binary codes and libraries of all types of the heterogeneous accelerators, generating a structure capable of dynamic binding by separating device binary codes for each type of the heterogeneous accelerators from the static fat binary, allocating a first compute node and first heterogeneous accelerators based on the first computing request.

9 Claims, 8 Drawing Sheets

(56) References Cited

U.S. PATENT DOCUMENTS

| | | | |
|---|---|---|---|
| 2013/0160016 A1* | 6/2013 | Gummaraju | G06F 9/5044 |
| | | | 718/102 |
| 2019/0324755 A1* | 10/2019 | Herr | G06F 8/443 |
| 2020/0167139 A1* | 5/2020 | Drepper | G06F 8/451 |
| 2020/0401440 A1* | 12/2020 | Sankaran | G06F 9/3887 |
| 2021/0096923 A1 | 4/2021 | Lippert et al. | |
| 2021/0200656 A1 | 7/2021 | Weissmann et al. | |
| 2023/0031226 A1 | 2/2023 | Lee et al. | |

FOREIGN PATENT DOCUMENTS

| | | |
|---|---|---|
| KR | 10-2034660 B | 10/2019 |
| KR | 10-2020-0107971 A | 9/2020 |
| KR | 10-2021-0086448 A | 7/2021 |
| KR | 10-2021-0127538 A | 10/2021 |

OTHER PUBLICATIONS

Korean Office Action issued on Aug. 28, 2023, in counterpart Korean Patent Application No. 10-2021-0192932 (6 pages in Korean).

* cited by examiner

METHOD OF REBINDING COMPUTING UNIT IN HETEROGENEOUS COMPUTING CLOUDS AND APPARATUS THEREOF

CROSS-REFERENCE TO RELATED APPLICATIONS

This application is the National Stage filing under 35 U.S.C. 371 of Korean Application No. 10-2021-0192932, filed on Dec. 30, 2021, the contents of which are all hereby incorporated by reference herein in their entirety.

BACKGROUND

1. Field

The present disclosure relates to a method of rebinding computing unit in heterogeneous computing clouds and apparatus thereof and, more particularly, to method of rebinding computing unit in heterogeneous computing clouds and apparatus thereof, in which only elements required for the computing unit are bound after a schedule, and recompilation or redundant elements are not included when the schedule is changed.

2. Related Art

Cloud computing refers to providing various elements required for tasks such as data processing, repository, transmission, or viewing using a computer to various types of terminal devices through services on the Internet. In order to utilize the computer, elements constituting the computer, such as software such as an application program, a data file, an operating system, a CPU, a memory, a disk repository, and a network, are needed. By placing these elements on the Internet and accessing and using them through a terminal device, it is possible to perform a requested computer task anytime and anywhere without having to purchase all required elements.

In heterogeneous computing clouds including two or more types of heterogeneous accelerators, a task unit is dynamically assigned and performs a task so as to use the heterogeneous accelerators. To this end, for a device kernel part of a program source code, there are 1) a JIT (Just-In Time) compile method that compiles after a schedule, and 2) a FAT binary format compile method that compiles for all heterogeneous accelerators included in heterogeneous computing clouds and then includes them in an execution file.

The JIT compile method of 1) requires additional time after a schedule to perform dynamic compilation and uses more memory because a compiler module is included in the task unit. Further, if the task unit is changed to use a different heterogeneous accelerator, recompilation should be undesirably performed. The FAT binary format compile method of 2) is problematic in that device binary codes for heterogeneous accelerators other than the arranged heterogeneous accelerator are included, so that memory, storage and network resource may be unnecessarily used. The methods of 1) and 2) unnecessarily use more resource because libraries for heterogeneous accelerators other than the heterogeneous accelerator disposed in the task unit are included. Thus, the overall throughput of the cloud system is reduced due to the longer preparation time for processing a computing request and fewer compute requests that may be processed concurrently.

SUMMARY

The present disclosure provides a dynamic rebinding method and device for a computing unit in heterogeneous computing clouds, in which only elements required for the computing unit are bound after a schedule, and recompilation or redundant elements are not included when the schedule is changed.

In an aspect, a dynamic rebinding method for a computing unit in heterogeneous computing clouds is provided. The method includes receiving a first computing request from a terminal, generating a static FAT binary by compiling a device binary codes for each of all types of heterogeneous accelerators based on the first computing request, generating and storing global data including device binary codes and libraries of all types of the heterogeneous accelerators, generating a structure capable of dynamic binding by separating device binary codes for each type of the heterogeneous accelerators from the static fat binary, allocating a first compute node and first heterogeneous accelerators based on the first computing request, dynamically binding a computing unit including the device binary codes and the library for the allocated first heterogeneous accelerators, transmitting the computing unit dynamically bound to the first compute node, operating the allocated first heterogeneous accelerators based on the computing unit, generating local caching data including device binary codes and libraries of all heterogeneous accelerators of the assigned first computer node excepting the assigned first heterogeneous accelerators from the stored global data, transmitting the local caching data to the assigned first compute node, receiving a second computing request from the terminal and determining an operation of the computer unit based on the second computing request.

In another aspect, a dynamic rebinding device for a computing unit in heterogeneous computing clouds, including a master node and a plurality of compute nodes, wherein each of the compute nodes comprises heterogeneous accelerators and a cache memory to temporarily store data, the master node comprises a transceiver transmitting or receiving data to or from a terminal and the plurality of compute nodes, a memory storing device binary codes and libraries for the heterogeneous accelerators, at least one processor connected to the memory and an input/output unit, the at least one processor receives a first computing request from a terminal, generates a static FAT binary by compiling a device binary codes for each of all types of heterogeneous accelerators based on the first computing request, generates and stores global data including device binary codes and libraries of all types of the heterogeneous accelerators, generates a structure capable of dynamic binding by separating device binary codes for each type of the heterogeneous accelerators from the static fat binary, allocates a first compute node and first heterogeneous accelerators based on the first computing request, dynamically binds a computing unit including the device binary codes and the library for the allocated first heterogeneous accelerators, transmits the computing unit dynamically bound to the first compute node, operates the allocated first heterogeneous accelerators based on the computing unit, generates local caching data including device binary codes and libraries of all heterogeneous accelerators of the assigned first computer node excepting the assigned first heterogeneous accelerators from the stored global data, transmits the local caching data to the assigned first compute node, receives a second computing request from the terminal and determines an operation of the computer unit based on the second computing request.

In a further aspect, a recording medium readable by a digital processing device is provided, in which a program of instructions executable by the digital processing device is tangibly implemented for a dynamic rebinding for a computing unit in heterogeneous computing clouds. A program for executing a dynamic rebinding method for a computing unit in heterogeneous computing clouds according to an aspect of the present disclosure in a computer is recorded.

A dynamic rebinding method and device for a computing unit in heterogeneous computing clouds according to an embodiment of the present disclosure provides the following effects.

Only elements required for the computing unit are bound so as not to consume additional time or use redundant memory after a schedule, when processing a computing request from a terminal device, and it is possible to dynamically rebind required elements so that recompilation or redundant elements are not included when the schedule is changed so that the computing unit uses a different heterogeneous accelerator.

Thus, it is possible to improve the overall throughput of a heterogeneous computing cloud by reducing additional time consumption for configuring a computing unit after a schedule and minimizing memory usage. Further, heterogeneous accelerator resources may be abstracted to provide transparency to users.

DESCRIPTION OF EXEMPLARY EMBODIMENTS

Hereinafter, an embodiment of the present disclosure will be described in detail with reference to the accompanying drawings. However, it is to be understood that the present description is not intended to limit the present disclosure to those exemplary embodiments. When it is determined that the detailed description of the known art related to the present disclosure may be obscure the gist of the disclosure, the detailed description thereof will be omitted.

Figure 1:
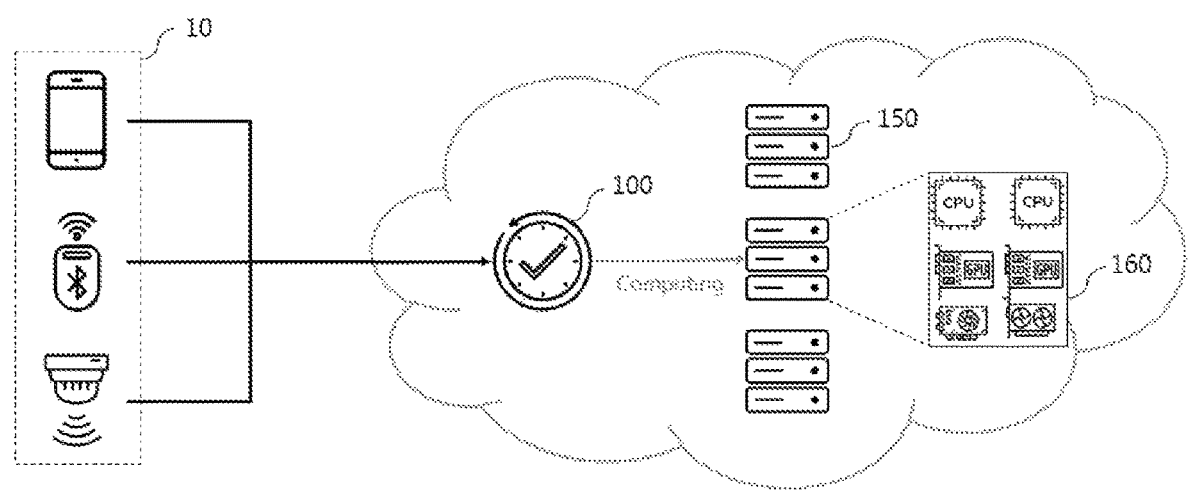
FIG. 1 is a conceptual diagram illustrating a heterogeneous computing cloud system according to an embodiment of the present disclosure.

FIG. 1 is a conceptual diagram illustrating a heterogeneous computing cloud system according to an embodiment of the present disclosure.

A terminal 10 may be fixed or mobile as a user device, and may include a digital camera, a mobile phone, a smart phone, a laptop computer, a tablet PC, an electronic book terminal, a digital broadcasting terminal, a personal digital assistant (PDA), a portable multimedia player (PMP), a navigation device, or a multimedia system providing a communication function.

A term "cloud server" refers to a server computer to which a client accesses to receive a cloud computing service (hereinafter referred to as a cloud service). Here, the cloud service refers to a computer environment in which predetermined information is permanently stored in a server on the Internet and temporarily stored in a client such as an IT device such as a digital photographing device, a tablet, a computer, a laptop, a netbook, or a smartphone. That is, this is a concept that all user information may be stored in the server on the Internet and this information may be used anytime and anywhere through various IT devices. In other words, this is a computing service that borrows computing resources such as hardware or software that is present in an intangible form such as a cloud as much as required and pays for the use, and means a technology in which computing resources present in different physical locations are integrated using virtualization technology and then provided.

In an embodiment of the present disclosure, a dynamic rebinding device for a computing unit in heterogeneous computing clouds may be a cloud server, and may include a master node 100 and a plurality of compute nodes 150. Further, each of the compute nodes may include heterogeneous accelerators.

If the master node receives a computing request from a terminal, this is queued in a request queue, and computing resources including the compute node and the heterogeneous accelerator available for each request are allocated so that a task scheduler may meet the requirements of all requests, and a processing order is determined. The series of processes is called a schedule.

After a schedule, a computing unit including an executable binary, library or the like should be generated to process a computing request. The generated computing unit is delivered to the compute node and then waits its turn to be executed in the task queue of the compute node. After completing the task using the assigned computing resource (including the operation of the accelerator), a task result is delivered to a user, a corresponding entry is removed from the task queue of the compute node, and an entry of the request queue of the master node is also removed.

If a current computing resource may not satisfy a requirement when there is a user's new computing request, a task scheduler may stop executing the computing unit that is being currently processed and generate the computing unit again. In this case, the regenerated computing unit may utilize an existing computing unit. The existing computing unit may be assigned with 1) different heterogeneous accelerators within the same compute node, 2) the same heterogeneous accelerators of different compute nodes, and 3) different heterogeneous accelerators of different compute nodes.

Figure 2:
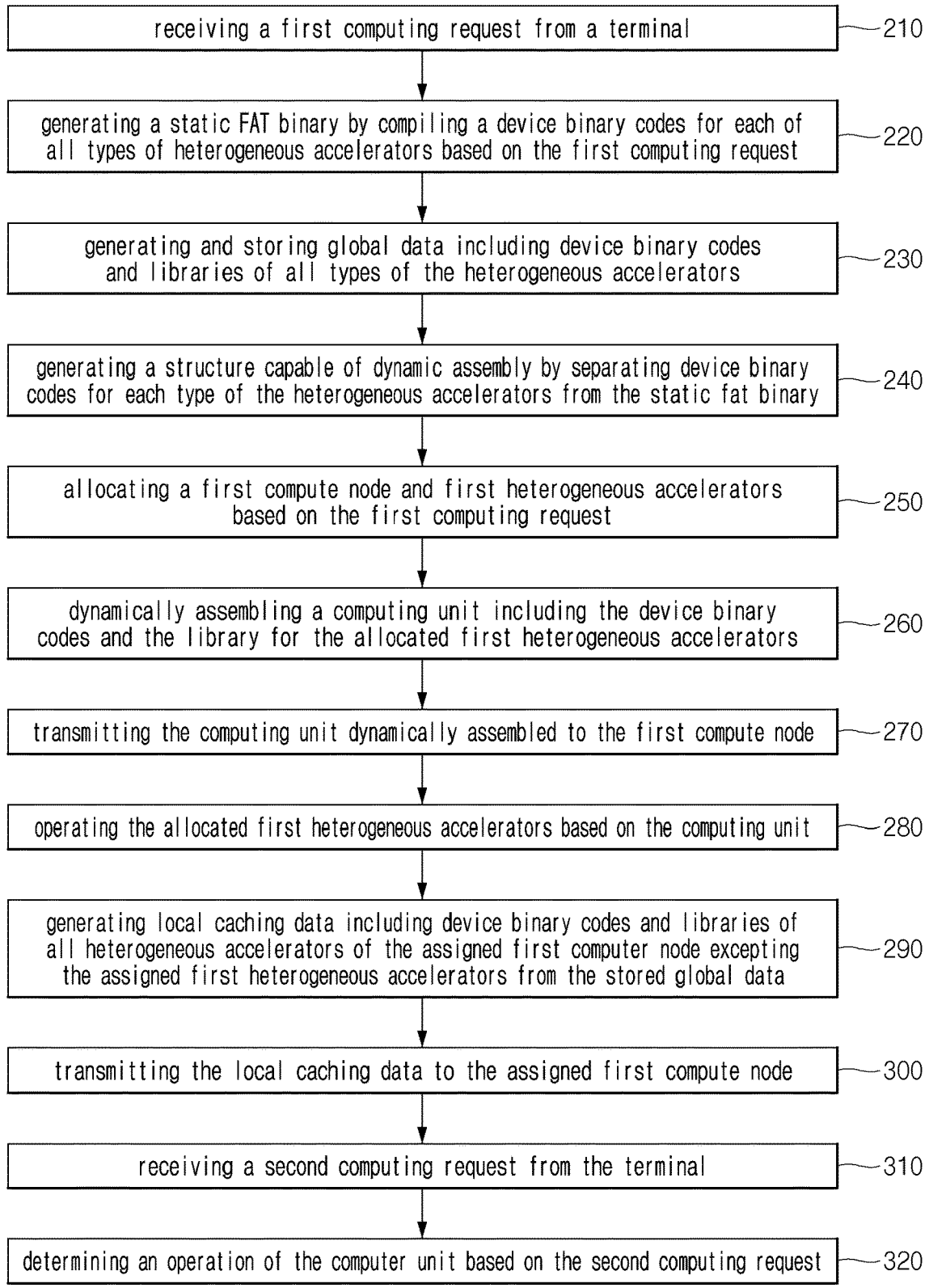
FIG. 2 is a flowchart illustrating a dynamic rebinding method for a computing unit in heterogeneous computing clouds according to an embodiment of the present disclosure.

FIG. 2 is a flowchart illustrating a dynamic rebinding method for a computing unit in heterogeneous computing clouds according to an embodiment of the present disclosure.

Referring to FIG. 2, the dynamic rebinding method for the computing unit in the heterogeneous computing clouds according to an embodiment of the present disclosure includes a step 210 of receiving a first computing request from a terminal, a step of 220 generating a static FAT binary by compiling a device binary codes for each of all types of heterogeneous accelerators based on the first computing request, a step of 230 generating and storing global data including device binary codes and libraries of all types of the heterogeneous accelerators, a step of 240 generating a structure capable of dynamic binding by separating device binary codes for each type of the heterogeneous accelerators from the static fat binary, a step of 250 allocating a first compute node and first heterogeneous accelerators based on the first computing request, a step of 260 dynamically binding a computing unit including the device binary codes and the library for the allocated first heterogeneous accelerators, a step of 270 transmitting the computing unit dynamically bound to the first compute node, a step of 280 operating the allocated first heterogeneous accelerators based on the computing unit, a step of 290 generating local caching data including device binary codes and libraries of all heterogeneous accelerators of the assigned first computer node excepting the assigned first heterogeneous accelerators from the stored global data, a step of 300 transmitting the local caching data to the assigned first compute node, a step of 310 receiving a second computing request from the terminal and a step of 320 determining an operation of the computer unit based on the second computing request.

receiving a first computing request from a terminal and compiling a device binary codes for each of all heterogeneous accelerators, a step 220 of assigning a first compute node and first heterogeneous accelerators on the basis of the first computing request, a step 230 of generating a computing unit including device binary codes and libraries for the assigned first heterogeneous accelerators, and generating and storing global data including device binary codes and libraries for all heterogeneous accelerators except for the assigned first heterogeneous accelerators, a step 240 of generating local caching data including device binary codes and libraries of all heterogeneous accelerators of the assigned first computer node except for the assigned first heterogeneous accelerators from the stored global data, a step 250 of transmitting the generated computing unit and local caching data to the assigned first compute node and causing the computing unit to be run, thereby operating the assigned first heterogeneous accelerators and temporarily storing the local caching data, and a step 260 of receiving a second computing request to stop executing the computing unit and determining an operation of the computing unit on the basis of the second computing request.

Figure 4:
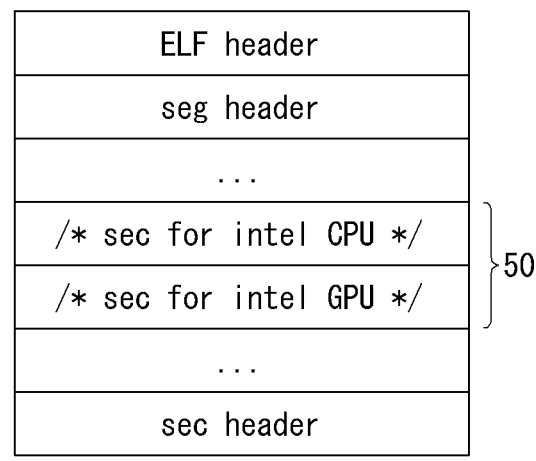
FIG. 4 is a diagram illustrating a FAT binary structure according to an embodiment of the present disclosure.

When a computing request from a user arrives at the request queue of the master node, each device binary codes is compiled for all heterogeneous accelerators supporting a source code in the heterogeneous computing clouds using a compiler for heterogeneous accelerators, and then is stored in a different section, thus generating one FAT binary. FIG. 4 is a diagram schematically illustrating a FAT binary structure, and the respective device binary codes are stored in different sections 50 of the FAT binary.

When the task scheduler assigns the compute node and heterogeneous accelerators for a corresponding computing request to use, a binder of the master node leaves only the device binary codes for the heterogeneous accelerators assigned from the FAT binary using a GNU binary utility, and binds required libraries to perform tasks in the FAT binary and the assigned heterogeneous accelerators, thus generating the computing unit. Further, the binder asynchronously stores separate and different sections of the FAT binary in a global repository of the master node.

The generated computing unit is delivered to the assigned compute node, and the binder caches the device binary codes and libraries for different heterogeneous accelerators mounted on the compute node assigned to the global repository in a local repository cache of the assigned compute node.

The compute node stores the delivered computing unit in the task queue entry and waits its turn to process the computing unit. If the computing unit normally completes its task, entries for the task queue and local repository cache of the compute node and the global repository and request queue of the master node are deleted.

Through the above-described series of processes, the computing unit has only the device binary codes and library required for execution without additional time consumption after a schedule.

Figure 3:
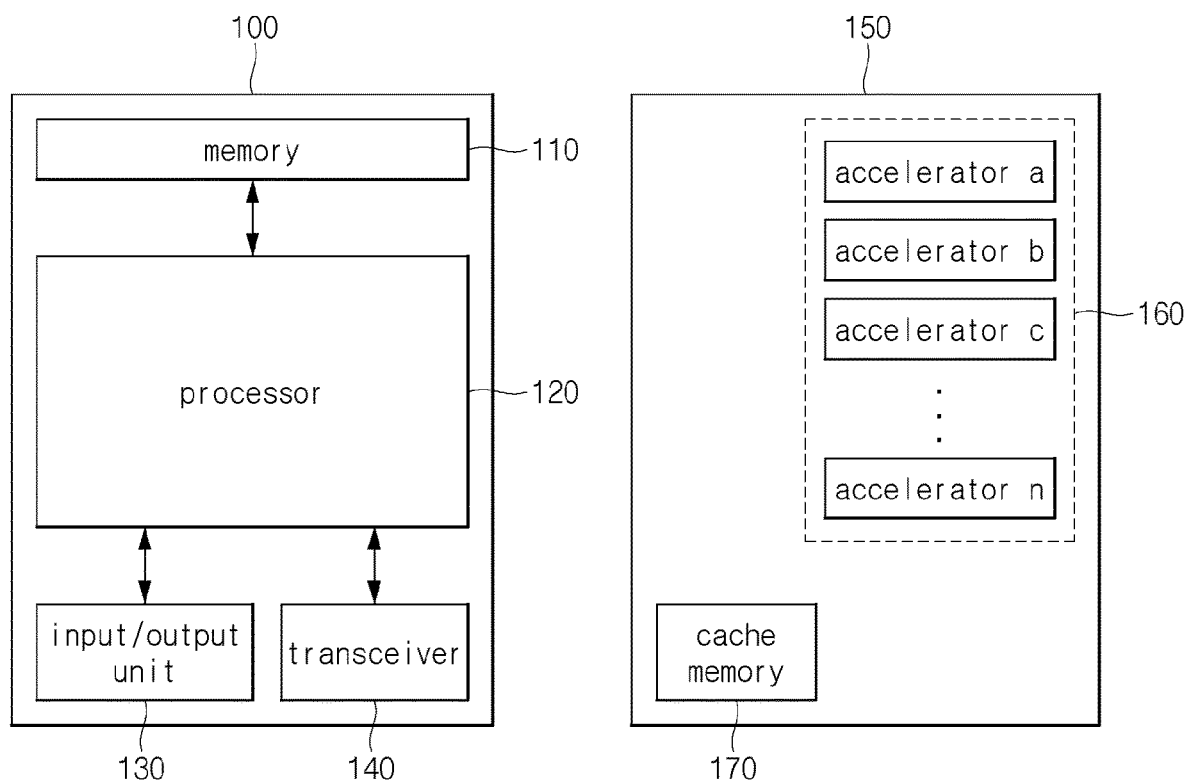
FIG. 3 is a block diagram illustrating a dynamic rebinding device for a computing unit in heterogeneous computing clouds according to an embodiment of the present disclosure.

FIG. 3 is a block diagram illustrating a dynamic rebinding device for a computing unit in heterogeneous computing clouds according to an embodiment of the present disclosure.

Referring to FIG. 3, in the dynamic rebinding device for the computing unit in heterogeneous computing clouds, including a master node and a plurality of compute nodes, according to an embodiment of the present disclosure, each of the compute nodes includes heterogeneous accelerators and a cache memory to temporarily store data, the master node includes a transceiver transmitting or receiving data to or from a terminal and the plurality of compute nodes, a memory storing device binary codes and libraries for the heterogeneous accelerators, at least one processor connected to the memory, and an input/output unit, and the at least one processor receives a first computing request from the terminal and compiles a device binary codes for each of all heterogeneous accelerators, assigns a first compute node and first heterogeneous accelerators on the basis of the first computing request, generates a computing unit including device binary codes and libraries for the assigned first heterogeneous accelerators, generates global data including device binary codes and libraries for all heterogeneous accelerators except for the assigned first heterogeneous accelerators and then stores the data in the memory, generates local caching data including device binary codes and libraries of all heterogeneous accelerators of the assigned first computer node except for the assigned first heterogeneous accelerators from the global data stored in the memory, transmits the generated computing unit and local caching data to the assigned first compute node and causes the computing unit to be run, thereby operating the assigned first heterogeneous accelerators and temporarily storing the local caching data in the cache memory, and receives a second computing request to stop executing the computing unit and determines an operation of the computing unit on the basis of the second computing request.

The dynamic rebinding device for the computing unit in the heterogeneous computing clouds may include a master node 100 and a plurality of compute nodes 150, and each of the compute nodes 150 may include heterogeneous accelerators 160 and a cache memory 170 that may temporarily store data.

The master node 100 may include a memory 110, a processor 120, an input/output unit 130, and a transceiver 140. The memory 110 is a recording medium that is readable in the master node 100 to store information used or output by the master node 100, and may include a permanent mass storage device such as RAM (random access memory), ROM (read only memory), and a disk drive. Further, a program code for the dynamic rebinding method 200 for the computing unit in the heterogeneous computing clouds may be stored in the memory 110.

The processor 120 may be configured to process commands of a computer program by performing basic calculation, logic, and input/output operations related to the dynamic rebinding method 200 for the computing unit in the heterogeneous computing clouds. The commands may be provided to the processor 120 by the memory 110 or the transceiver 140. For example, the processor 120 may be configured to execute received commands according to a program code stored in a recording device such as the memory 110. The processor 120 may be configured to execute the program code for the compute node. Such a program code may be stored in a recording device such as the memory 110.

The input/output unit 130 may be a device for receiving information from a user and a display for outputting information. For example, an input device may include a microphone, a keyboard, or a mouse, while an output device may include a display, a speaker, etc. The transceiver 140 may provide a function for communicating the master node 100 with the terminal 10 and the compute node 150 through a network.

Further, in other embodiments, the master node 100 and the compute node 150 may include fewer or more components than those of FIG. 3. However, the explicit illustration of most conventional components is omitted. For example, the dynamic rebinding device for the computing unit in the heterogeneous computing clouds, including the master node 100 and the plurality of compute nodes 150, may be implemented to include at least some of the above-described input/output devices or may further include other components such as an interface such as a network interface, a transceiver, or a database.

Figure 5:
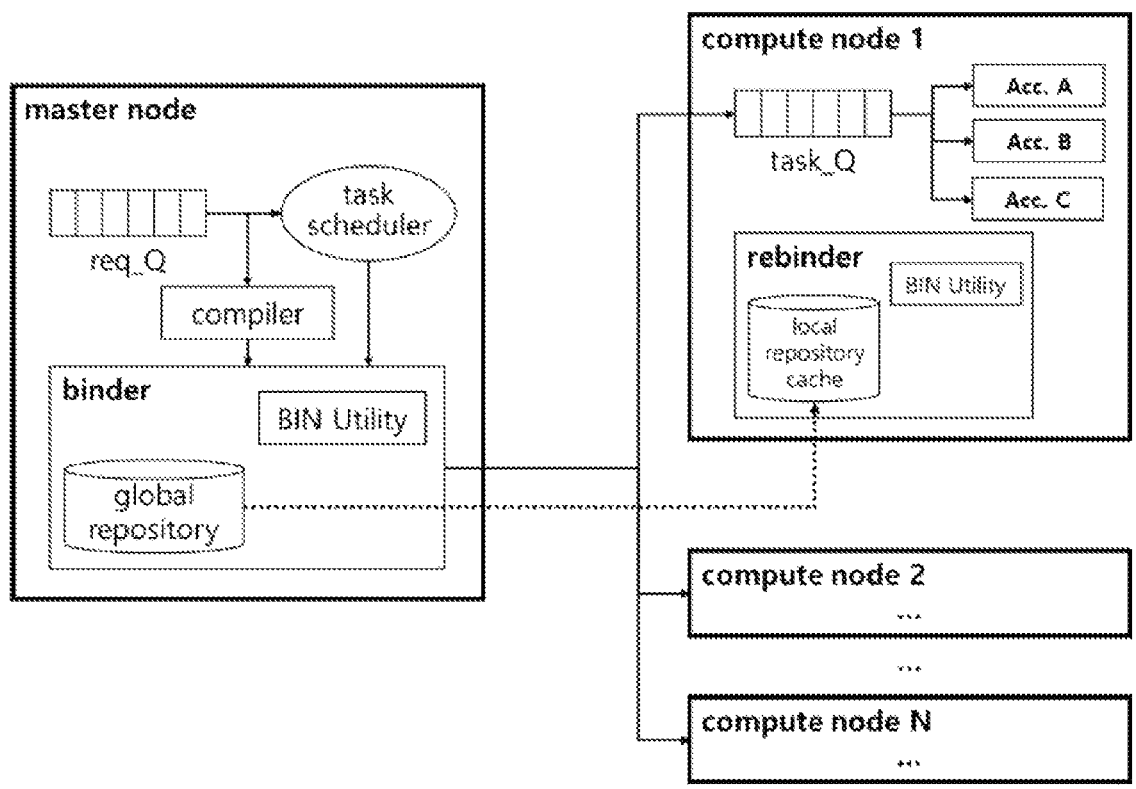
FIG. 5 is a diagram illustrating a process of processing a computing request according to an embodiment of the present disclosure.

FIG. 5 is a diagram illustrating a process of processing a computing request according to an embodiment of the present disclosure.

In an embodiment of the present disclosure, the master node and the compute node may include the following components.

A compiler for a heterogeneous accelerator compiles a device kernel part of the source code into a device binary codes targeting the heterogeneous accelerators supported by a heterogeneous cloud computing system, is loaded into a section for each target heterogeneous accelerator, and compiles host codes and device binary codes in a FAT binary form.

A task scheduler assigns resources such as the heterogeneous accelerator, the memory, or the storage on the basis of the computing request from the terminal, and determines the processing order of the computing request.

A binder generates the computing unit according to a decision, when the task scheduler schedules for a specific computing request, and includes a GNU binary utility and a global repository.

The GNU binary utility provides functions for extracting, deleting, and correcting a specific section (i.e., device binary codes) for the FAT binary.

The global repository stores device binary codes and libraries for all the heterogeneous accelerators supported by the heterogeneous computing clouds except for the heterogeneous accelerator assigned to the computing unit. Further, the device binary codes and libraries for all the heterogeneous accelerators supported by the assigned compute node are cached in the local repository cache.

A rebinder is provided on the compute node. When the task scheduler changes assignment to use different heterogeneous accelerators for the heterogeneous accelerator used by a specific running computing unit, the rebinder removes the device binary codes and libraries required for computing from the existing heterogeneous accelerator, loads the device binary codes and libraries for the new heterogeneous accelerator in the local repository cache, and rebinds them with the computing unit. The rebinder includes a GNU binary utility and a local repository cache.

The local repository cache is provided on the compute node, and computing units which are currently being executed or waits to be executed cache the device binary codes and library required for computing heterogeneous accelerators supported by compute nodes other than the currently assigned heterogeneous accelerator. When a task is completed or the computing unit is reassigned to another compute node, associated device binary codes and libraries are removed from a cache entry.

In an embodiment of the present disclosure, the process of processing a specific computing request is as follows. This is the same as the above description of FIG. 2.

When a computing request from a user arrives at the request queue of the master node, the source code compiles the device binary codes for all heterogeneous accelerators supported by the heterogeneous computing cloud using the compiler for the heterogeneous accelerator, and stores the device binary codes in different sections to generate one FAT binary. The device binary codes are stored in different sections 50 of the FAT binary (see FIG. 4).

When the task scheduler assigns the compute node and heterogeneous accelerators for a corresponding computing request to use, the binder of the master node leaves only the device binary codes for the heterogeneous accelerators assigned from the FAT binary using the GNU binary utility, and binds required libraries to perform tasks in the FAT binary and the assigned heterogeneous accelerators, thus generating the computing unit. Further, the binder asynchronously stores separate and different sections of the FAT binary in the global repository of the master node.

The generated computing unit is delivered to the assigned compute node, and the binder caches the device binary codes and libraries for different heterogeneous accelerators mounted on the compute node assigned to the global repository in the local repository cache of the assigned compute node.

The compute node stores the delivered computing unit in the task queue entry and waits its turn to process the computing unit. If the computing unit normally completes its task, entries for the task queue and local repository cache of the compute node and the global repository and request queue of the master node are deleted.

Through the above-described series of processes, the computing unit has only the device binary codes and library required for execution without additional time consumption after a schedule.

Hereinafter, a request processing process for a case where the master node receives a new computing request from the terminal will be described.

In an embodiment of the present disclosure, the determination of the operation of the computing unit on the basis of the second computing request assigns the second compute node and the second heterogeneous accelerators on the basis of the second computing request, and determines whether the first compute node and the second compute node are equal to each other and whether the first heterogeneous accelerators and the second heterogeneous accelerators are equal to each other, thereby determining the operation of the computing unit.

When the master node receives the new computing request from the terminal, the existing computing unit which operates the heterogeneous accelerators stops running, and assigns the compute node and heterogeneous accelerators again on the basis of the new computing request. The assignment is divided into (1) different heterogeneous accelerator in the same compute node, (2) the same heterogeneous accelerators of the different compute node, and (3) different heterogeneous accelerators of the different compute node. The subsequent operation of the existing computing unit varies depending on each case.

In other words, it is determined whether the compute node (first compute node) and heterogeneous accelerators (first heterogeneous accelerators) assigned on the basis of an original computing request (first computing request), and the compute node (second compute node) and heterogeneous accelerators (second heterogeneous accelerators) which are newly assigned on the basis of a new computing request (second computing request) are equal to each other, so the subsequent operation of the existing computing unit varies depending on each of the above-described cases (1) to (3).

Figure 6:
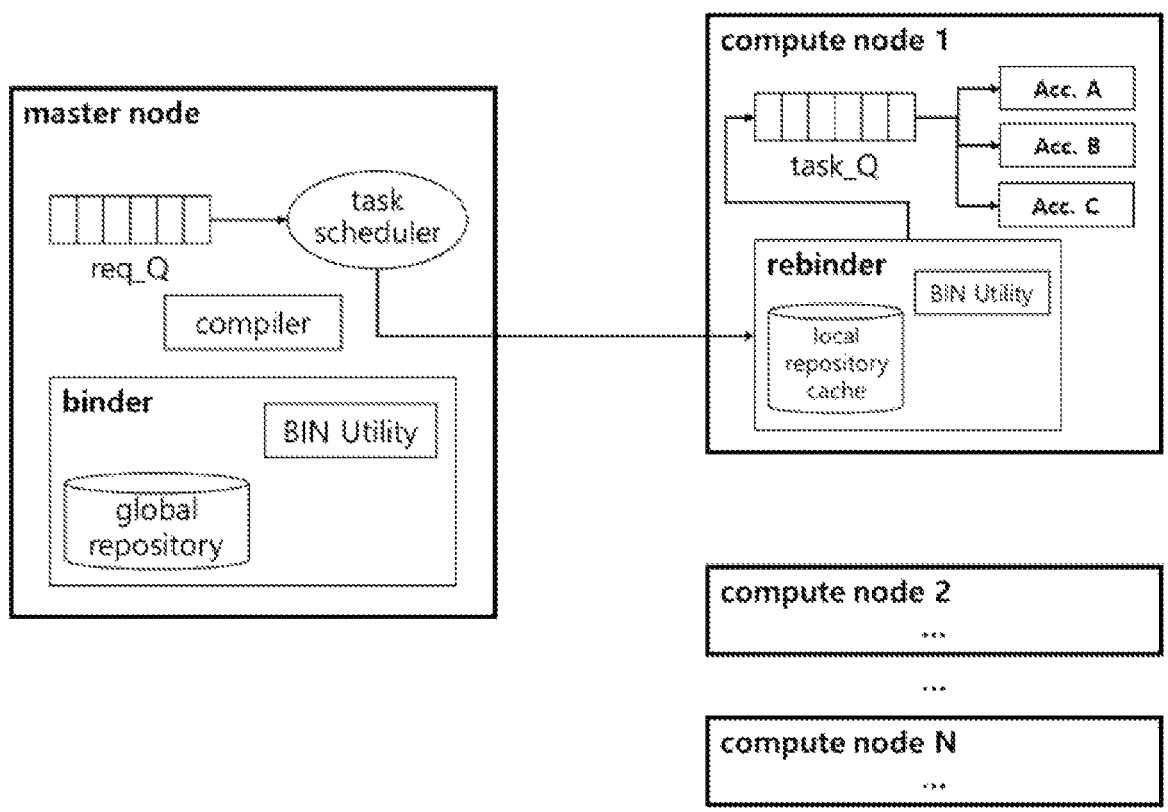
FIG. 6 is a diagram illustrating a dynamic rebinding process of a computing unit when the computing unit is assigned with a different heterogeneous accelerator within the same compute node according to an embodiment of the present disclosure.

FIG. 6 is a diagram illustrating a dynamic rebinding process of a computing unit when the computing unit is assigned with a different heterogeneous accelerator within the same compute node according to an embodiment of the present disclosure.

In an embodiment of the present disclosure, when it is determined that the first compute node and the second compute node are equal to each other and the first heterogeneous accelerators and the second heterogeneous accelerators are not equal to each other, the computing unit removes the device binary codes and library for the first heterogeneous accelerators from the first compute node, regenerates to include the device binary codes and library for the second heterogeneous accelerators using the local caching data that is temporarily stored in the first compute node, and executes the regenerated computing unit, thereby operating the assigned second heterogeneous accelerators.

When it corresponds to the above case (1) and different heterogeneous accelerators in the same compute node are assigned, the rebinder of the compute node removes the device binary codes and libraries for the heterogeneous accelerators that are previously assigned in the computing unit, using the GNU BIN utility, and loads the device binary codes and libraries for the new heterogeneous accelerator in the local repository cache, thereby rebinding (i.e. regenerating) the computing unit. The rebound computing unit is sent to the task queue of the compute node.

Figure 7:
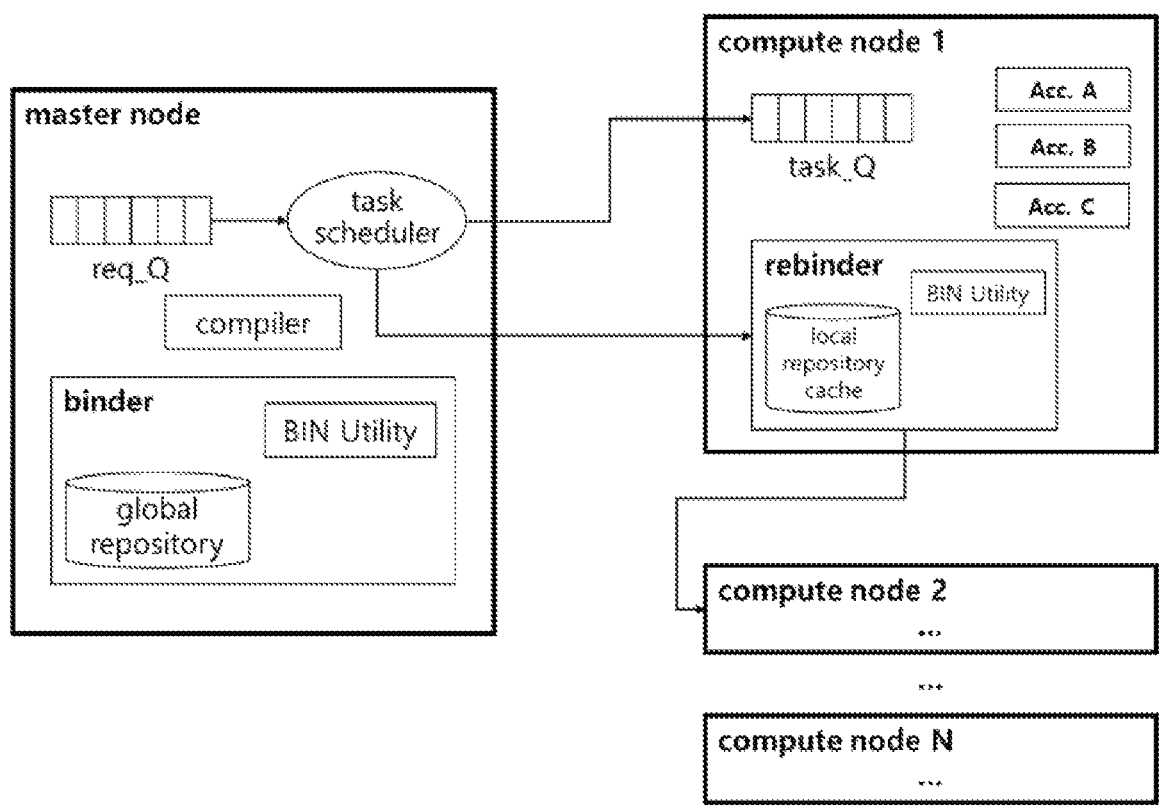
FIG. 7 is a diagram illustrating a dynamic rebinding process of a computing unit when the computing unit is assigned with the same heterogeneous accelerator within a different compute node according to an embodiment of the present disclosure.

FIG. 7 is a diagram illustrating a dynamic rebinding process of a computing unit when the computing unit is assigned with the same heterogeneous accelerator within a different compute node according to an embodiment of the present disclosure.

In an embodiment of the present disclosure, when it is determined that the first compute node and the second compute node are not equal to each other and the first heterogeneous accelerators and the second heterogeneous accelerators are equal to each other, the computing unit is transmitted from the first compute node to the second compute node, and the transmitted computing unit is executed, thereby operating the assigned second heterogeneous accelerators.

When it corresponds to the above case (2) and the same heterogeneous accelerators in the different compute node are assigned, the computing unit is sent from an original compute node (first compute node) to a task queue of a different compute node (second compute node) without a change in state.

Figure 8:
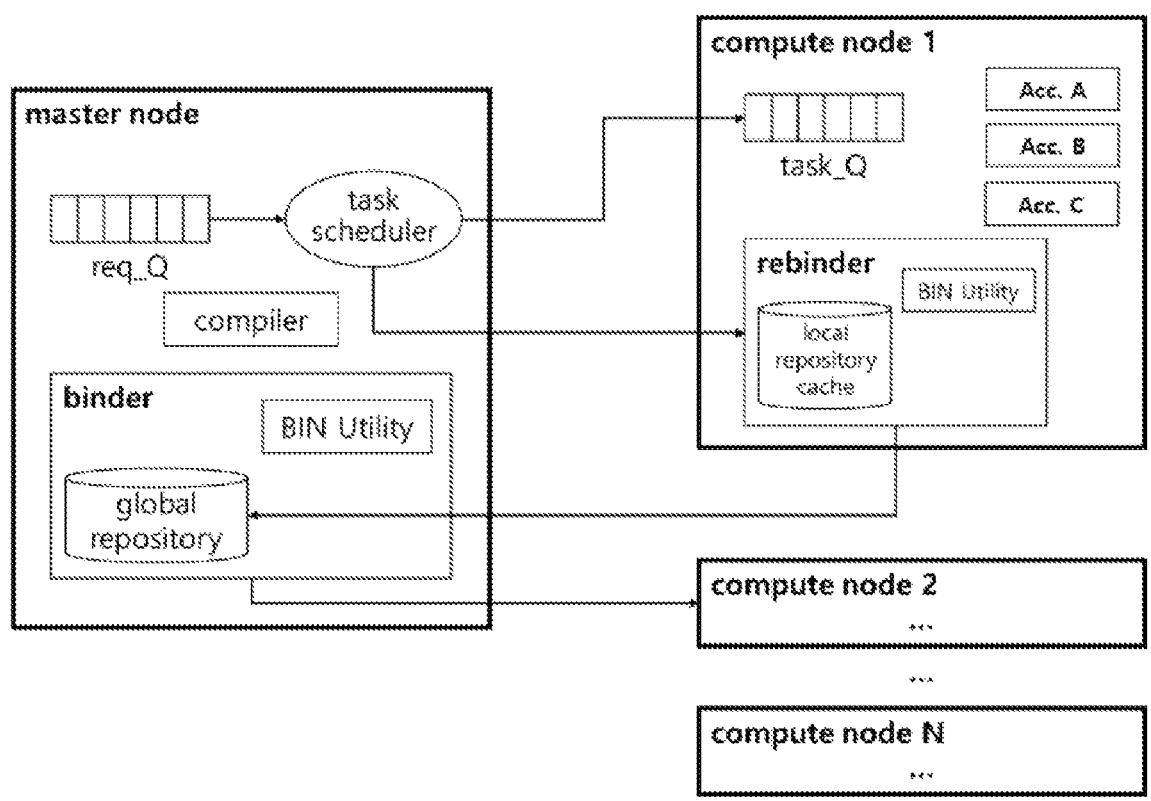
FIG. 8 is a diagram illustrating a dynamic rebinding process of a computing unit when the computing unit is assigned with a different heterogeneous accelerator within a different compute node according to an embodiment of the present disclosure.

FIG. 8 is a diagram illustrating a dynamic rebinding process of a computing unit when the computing unit is assigned with a different heterogeneous accelerator within a different compute node according to an embodiment of the present disclosure.

In an embodiment of the present disclosure, when it is determined that the first compute node and the second compute node are not equal to each other and the first heterogeneous accelerators and the second heterogeneous accelerators are not equal to each other, the computing unit is received from the first compute node, removes the device binary codes and library for the first heterogeneous accelerators, and regenerates to include the device binary codes and library for the assigned second heterogeneous accelerators using the global data. The regenerated computing unit is transmitted to the second compute node, and is executed to operate the assigned second heterogeneous accelerators.

When it corresponds to the above case (3) and different heterogeneous accelerators in the different compute node are assigned, the computing unit is delivered from the compute node to the binder of the master node, and the binder rebinds (i.e. regenerates) the computing unit with device binary codes and libraries for the newly assigned heterogeneous accelerators (second heterogeneous accelerators) from the global repository. The rebound computing unit is sent to the task queue of the newly assigned compute node (second compute node).

Even when the computing unit is reassigned to a new heterogeneous accelerator through the above-described dynamic rebinding method, device binary codes and libraries required for computing in the new heterogeneous accelerator may be delivered at a low cost without recompilation.

The conventional JIT compile method requires additional time after a schedule to perform dynamic compilation and uses more memory because a compiler module is included in the task unit. Further, if the task unit is changed to use a different heterogeneous accelerator, recompilation should be undesirably performed. Referring to FIGS. 6 to 8, it can be seen that the dynamic rebinding method for the computing unit in the heterogeneous computing clouds according to an embodiment of the present disclosure does not require compilation in the process of performing the new computing request that changes the heterogeneous accelerators to be operated.

The conventional FAT binary format compile method is problematic in that device binary codes for other heterogeneous accelerators other than the arranged heterogeneous accelerator are included, so that memory may be unnecessarily used. Turning back to FIGS. 6 to 8, it can be seen that the conventional FAT binary format compile method is different from the above-described cases (1) to (3) in that all the device binary codes and libraries for the entire heterogeneous accelerator are included when generating the computing unit and delivering it to the compute node.

As described above, an embodiment of the present disclosure provides a dynamic rebinding method and device for a computing unit in heterogeneous computing clouds, in which only elements required for the computing unit are bound so as not to consume additional time or use redundant memory after a schedule, when processing a computing request from a terminal device, and it is possible to dynamically rebind required elements so that recompilation or redundant elements are not included when a schedule is changed so that the computing unit uses a different heterogeneous accelerator. Thus, data transfer speed is increased in proportion to a reduction in size of the device binary codes and library, and the number of computing requests that can be simultaneously processed throughout the heterogeneous computing cloud is increased, thereby improving the throughput of the cloud.

The above-described devices may be implemented as hardware components, software components, and/or a combination of hardware components and software components. For example, devices and components described in embodiments may be implemented using one or more general purpose or special purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may run an operating system (OS) and one or more software applications performed on the operating system. Further, the processing device may access, store, manipulate, process, and generate data in response to execution of software. For convenience of understanding, one processing device may be used, but those skilled in the art will understand that the processing device includes a plurality of processing elements and/or a plurality of types of processing elements. For example, the processing device may include a plurality of processors or one processor and one controller. Further, other processing configurations are also possible, such as parallel processors.

Meanwhile, the embodiments of the present disclosure can be implemented as computer readable codes in a computer readable recording medium. The computer readable recording medium includes all types of recording devices in which data that can be read by a computer system is stored.

Examples of the computer readable recording medium may include ROM, RAM, CD-ROM, magnetic tape, floppy disk, optical data storage devices, etc., and also include implementations in the form of carrier waves (e.g., transmission over the Internet). Further, the computer readable recording medium may be distributed to computer systems connected through a network, so that computer readable codes may be stored and executed in a distributed manner. In addition, functional programs, codes, and code segments for implementing the present disclosure can be easily inferred by programmers in the technical field to which the present disclosure belongs.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A dynamic rebinding method for a computing unit in heterogeneous computing clouds, the method comprising:
   receiving a first computing request from a terminal;
   generating a static FAT binary by compiling device binary codes for each of all types of heterogeneous accelerators based on the first computing request;
   generating and storing global data including the device binary codes and libraries of all types of the heterogeneous accelerators;
   generating a structure capable of dynamic binding by separating the device binary codes for each type of the heterogeneous accelerators from the static FAT binary;
   allocating a first compute node and first heterogeneous accelerators based on the first computing request;
   dynamically binding the computing unit including the device binary codes and the libraries for the allocated first heterogeneous accelerators;
   transmitting the computing unit dynamically bound to the first compute node;
   operating the allocated first heterogeneous accelerators based on the computing unit;
   generating local caching data including the device binary codes and the libraries of all heterogeneous accelerators of the assigned first computer node excepting the assigned first heterogeneous accelerators from the stored global data;
   transmitting the local caching data to the assigned first compute node;
   receiving a second computing request from the terminal; and
   determining an operation of the computing unit based on the second computing request,
   wherein the determining of the operation of the computing unit comprises:
   allocating a second compute node and second heterogeneous accelerators based on the second computing request, and
   determining the operation of the computing unit based on whether the first compute node and the second compute node are identical and whether the first heterogeneous accelerators and the second heterogeneous accelerators are identical.

2. The method of claim 1, wherein, when the first compute node and the second compute node are identical and the first heterogeneous accelerators and the second heterogeneous accelerators are not identical, the computing unit removes the device binary codes and the libraries for the first heterogeneous accelerators from the first compute node, regenerates to include the device binary codes and the libraries for the second heterogeneous accelerators using the local caching data that is temporarily stored in the first compute node, and executes the regenerated computing unit, thereby operating the assigned second heterogeneous accelerators.

3. The method of claim 1, wherein, when it is determined that the first compute node and the second compute node are not identical and the first heterogeneous accelerators and the second heterogeneous accelerators are identical, the computing unit is transmitted from the first compute node to the second compute node, and the transmitted computing unit is executed, thereby operating the assigned second heterogeneous accelerators.

4. The method of claim 1, wherein, when it is determined that the first compute node and the second compute node are not identical and the first heterogeneous accelerators and the second heterogeneous accelerators are not identical, the computing unit is received from the first compute node, removes the device binary codes and the libraries for the first heterogeneous accelerators, and regenerates to include the device binary codes and the libraries for the assigned second heterogeneous accelerators using the global data, and
   wherein the regenerated computing unit is transmitted to the second compute node, and is executed to operate the assigned second heterogeneous accelerators.

5. A dynamic rebinding device for a computing unit in heterogeneous computing clouds, comprising:
   a master node and a plurality of compute nodes,
   wherein each of the plurality of compute nodes comprises heterogeneous accelerators and a cache memory to temporarily store data, wherein the master node comprises:
  a transceiver transmitting or receiving data to or from a terminal and the plurality of compute nodes;
  a memory storing device binary codes and libraries for the heterogeneous accelerators;
  at least one processor connected to the memory; and
  an input/output unit,
wherein the at least one processor is configured to:
  receives a first computing request from the terminal;
  generate a static FAT binary by compiling the device binary codes for each of all types of heterogeneous accelerators based on the first computing request;
  generate and store global data including the device binary codes and the libraries of all types of the heterogeneous accelerators;
  generate a structure capable of dynamic binding by separating the device binary codes for each type of the heterogeneous accelerators from the static FAT binary;
  allocate a first compute node and first heterogeneous accelerators based on the first computing request;
  dynamically bind the computing unit including the device binary codes and the libraries for the allocated first heterogeneous accelerators;
  transmit the computing unit dynamically bound to the first compute node;
  operate the allocated first heterogeneous accelerators based on the computing unit;
  generate local caching data including the device binary codes and the libraries of all heterogeneous accelerators of the assigned first computer node excepting the assigned first heterogeneous accelerators from the stored global data;
  transmit the local caching data to the assigned first compute node;
  receive a second computing request from the terminal; and
  determine an operation of the computing unit based on the second computing request, and
wherein the at least one processor is further configured to:
  allocate a second compute node and second heterogeneous accelerators based on the second computing request, and
  determine the operation of the computing unit based on whether the first compute node and the second compute node are identical and whether the first heterogeneous accelerators and the second heterogeneous accelerators are identical.

6. The device of claim 5, wherein, when the first compute node and the second compute node are identical and the first heterogeneous accelerators and the second heterogeneous accelerators are not identical, the computing unit removes the device binary codes and the libraries for the first heterogeneous accelerators from the first compute node, regenerates to include the device binary codes and the libraries for the second heterogeneous accelerators using the local caching data that is temporarily stored in the first compute node, and executes the regenerated computing unit, thereby operating the assigned second heterogeneous accelerators.

7. The device of claim 5, wherein, when it is determined that the first compute node and the second compute node are not identical and the first heterogeneous accelerators and the second heterogeneous accelerators are identical, the computing unit is transmitted from the first compute node to the second compute node, and the transmitted computing unit is executed, thereby operating the assigned second heterogeneous accelerators.

8. The device of claim 5, wherein, when it is determined that the first compute node and the second compute node are not identical and the first heterogeneous accelerators and the second heterogeneous accelerators are not identical, the computing unit is received from the first compute node, removes the device binary codes and the libraries for the first heterogeneous accelerators, regenerates to include the device binary codes and the libraries for the assigned second heterogeneous accelerators using the global data, the regenerated computing unit is transmitted to the second compute node, and is executed to operate the assigned second heterogeneous accelerators.

9. A non-transitory recording medium readable by a digital processing device, in which a program of instructions executable by the digital processing device is tangibly implemented to dynamically rebind a computing unit in heterogeneous computing clouds, wherein the digital processing device comprising at least one processor is configured to execute the instructions of the program recorded in the recording medium, thereby configuring the at least one processor to:
  receive a first computing request from a terminal;
  generate a static FAT binary by compiling device binary codes for each of all types of heterogeneous accelerators based on the first computing request;
  generate and store global data including the device binary codes and libraries of all types of the heterogeneous accelerators;
  generate a structure capable of dynamic binding by separating the device binary codes for each type of the heterogeneous accelerators from the static FAT binary;
  allocate a first compute node and first heterogeneous accelerators based on the first computing request;
  dynamically bind the computing unit including the device binary codes and the libraries for the allocated first heterogeneous accelerators;
  transmit the computing unit dynamically bound to the first compute node;
  operate the allocated first heterogeneous accelerators based on the computing unit;
  generate local caching data including the device binary codes and the libraries of all heterogeneous accelerators of the assigned first computer node excepting the assigned first heterogeneous accelerators from the stored global data;
  transmit the local caching data to the assigned first compute node;
  receive a second computing request from the terminal; and
  determine an operation of the computing unit based on the second computing request, and
wherein the at least one processor is further configured to:
  allocate a second compute node and second heterogeneous accelerators based on the second computing request, and
  determine the operation of the computing unit based on whether the first compute node and the second compute node are identical and whether the first heterogeneous accelerators and the second heterogeneous accelerators are identical.

* * * * *